E. A. HAWTHORNE.
BATTERY AND CONTAINER.
APPLICATION FILED JUNE 22, 1914.
1,194,497.
Patented Aug. 15, 1916.
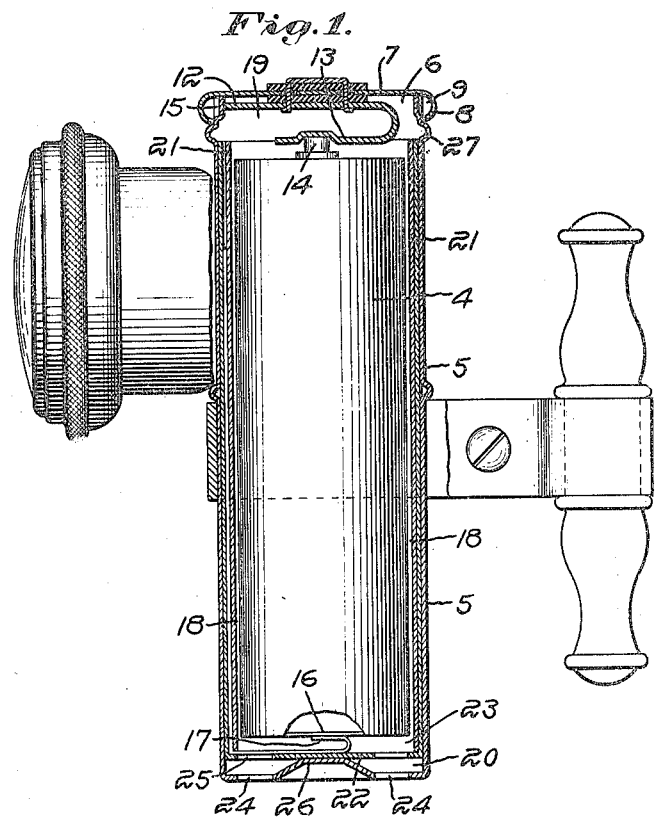
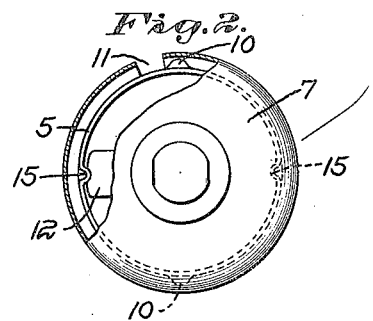
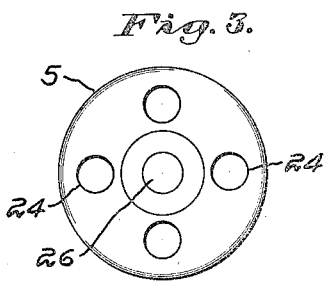
Witnesses:
Carl L. Choate.
Horace A. Crosman
Inventor:
Ellsworth A. Hawthorne,
by Booth, Janney & Varney
Attys.

UNITED STATES PATENT OFFICE.

ELLSWORTH A. HAWTHORNE, OF BRIDGEPORT, CONNECTICUT.

BATTERY AND CONTAINER.

1,194,497.

Specification of Letters Patent.  Patented Aug. 15, 1916.

Application filed June 22, 1914. Serial No. 846,498.

*To all whom it may concern:*

Be it known that I, ELLSWORTH A. HAWTHORNE, a citizen of the United States, residing at Bridgeport, in the county of Fairfield and State of Connecticut, have invented an Improvement in Batteries and Containers, of which the following description, in connection with the accompanying drawings, is a specification, like characters on the drawings representing like parts.

This invention relates to batteries and their containers, and is more especially concerned with a dry battery and the casing therefor having provision whereby the removal of the battery from its casing is facilitated.

My invention will be best understood by reference to the following specification when taken in connection with the accompanying drawings of one illustrative embodiment thereof, while its scope will be more particularly pointed out in the appended claims.

In the drawings:—Figure 1 is a central vertical sectional view, partly in elevation, of an electric lamp having a battery and battery casing embodying my invention; Fig. 2 is a top plan of the battery casing showing the cover partly broken away and in section; and Fig. 3 is a bottom plan view of the casing illustrating the perforated bottom.

Referring to the drawings and to the embodiment of my invention, which I have selected for illustration, I have there shown an electric lamp having as a means of current supply a battery 4, which in the present instance is a dry battery inclosed within a container in the form of a casing 5, the latter being herein of generally cylindrical shape and having at one end an opening 6 for the introduction and removal of the battery. In the present instance, this opening is closed by an appropriate closure 7 which may be in the form of a rotatable cap provided with a circumferential bead 8 having therein an annular recess 9 to receive one or more, herein two, projections 10 on the casing 5 whereby the cap is normally held in its place on the casing but is permitted to turn.

In order to provide for the removal of the cap, its bead 8 is herein provided with an opening or notch 11, which when turned into register with one of the lateral projections 10 permits the latter to be withdrawn from the circumferential recess 9. The cap may carry a switch or contact member 12 appropriately insulated therefrom and having a yielding arm 13 normally contacting with a terminal or pole piece 14 of the battery. This contact piece or switch may be turned and caused to complete or break the battery circuit by connecting or disconnecting the described terminal with the metallic battery casing through engagement of the contact piece with an inwardly extending projection 15 formed on the casing.

The battery 4, as is usual with batteries of this class, is provided, at its lower end with a metallic terminal or pole piece 16 contacting with a contact member or conductor 17, leading to the lamp terminal or other current consumption means, it being understood that the casing itself will be connected to the other terminal of such lamp and the circuit will be completed and interrupted through the use of the described switch, the connection being through the casing 5, member 12, arm 13 and pole piece 14. The construction just described is merely an illustrative example, however, and my present invention is not concerned with the switch mechanism and the conductors whereby the circuit is completed and interrupted.

In the use of dry batteries, it is often found that when the battery is closely confined in its casing, especially in summer, the material of which the battery is composed exudes, flows about the sides of the battery and dries or crystallizes, thus causing the battery to become fastened to the sides or internal walls of its container in such a manner that it is extremely difficult to extract the battery therefrom. This action is called "freezing". Heretofore when this has taken place, it has been frequently necessary to bore the batteries out of their containers because they have been "frozen" in place so badly. As a means for preventing such "freezing" of the battery to its casing, I have herein provided for the circulation of air about the top, sides and bottom of the battery. To this end, the battery is herein separated from its casing about its sides by an air space 18, at its top by a chamber 19, and at its bottom by a chamber 20. In the form shown, there is interposed between the battery and its casing a double walled jacket or envelop 21 of appropriate material, as for example, as heavy paper, the same being provided with a bottom 22.

It will be observed that the contact member or conductor 17, is interposed between the bottom or inner end of the battery and the bottom or inner end 22 of the inclosing jacket 21, whereby there is formed between the two an air space 23 which directly communicates with the annular air space 18 about the circumference of the battery, and since the circumferential air space directly communicates with the chamber 19 at the opposite end of the casing, a complete air space is formed about all sides of the battery.

As a means for admitting external air to the described air space within the casing, the latter may be provided with one or more, herein a plurality, of perforations 24. These perforations will by preference be located in the bottom of the casing, so that while permitting the entrance of air, they will not admit rain, if the casing be placed in an upright position as shown. This is a matter of considerable importance in case the lamp is used out of doors, as for example, on a vehicle.

In order to provide for the entrance of external air into the air space within the envelop or jacket 21, the bottom 22 of the latter is likewise provided with one or more, herein a plurality, of perforations 25, establishing communication between the chambers 20 and 23. As a means for maintaining the chamber 20 and supporting the jacket 21, which contains the battery, in spaced relation with the bottom of the casing and the perforation or perforations therein, the bottom of the casing is herein provided with a raised portion 26, preferably centrally located. It will now be apparent that the described perforations provide for the entrance of external air to the casing and the air spaces about the battery provide for a complete circulation of such air, so that the tendency of the battery to become "frozen" to the walls of the container is practically nullified. The perforations, moreover, provide for the introduction of a suitable implement to push the battery out of its container whether or not "frozen" therein.

The metal of which the battery casing is formed is usually rather thin and to a certain extent likely to become distorted or collapse about the opening 6 through which the battery is introduced and removed. Such distortion of the casing, if permanent, would, of course, diminish to a considerable extent or close the air space between the battery and its casing, and would be apt to interfere with the circulation of air, as well as make it difficult to withdraw the battery from its casing. In order to prevent such distortion or collapse of the casing about its entrance, I have herein provided strengthening means about the opening, preferably in the form of a circumferential bead 27, which lends great strength to the circumferential wall of the casing and makes the latter so strong that there is no danger of its becoming distorted with ordinary reasonable use, and the casing may even be subjected to considerable stress without likelihood of pinching the battery. The bead, moreover, lends such strength to the edge of the casing about the opening that the interengagement of the projections 10 with the annular recess 9 cannot be interrupted in ordinary usage.

While I have herein shown and described one specific embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described my invention, what I claim and desire by Letters Patent to procure is:—

1. The combination with a portable battery, of a battery holder inclosing said battery and conforming substantially to the shape thereof but separated therefrom by an air space, and provided with one or more apertures to admit outside atmosphere to said air space into direct contact with the battery.

2. The combination with a portable battery, of a battery holder inclosing said battery and conforming substantially to the shape thereof but separated therefrom at the sides by an air space, and provided with one or more apertures to admit outside atmosphere to said air space into direct contact with the battery.

3. The combination with a portable battery, of a battery holder inclosing said battery and conforming substantially to the shape thereof but separated therefrom on the sides and bottom by an air space, and provided with one or more apertures to admit outside atmosphere to said air space into direct contact with the battery.

4. The combination with a portable battery, of a battery holder inclosing said battery and conforming substantially to the shape thereof but separated therefrom on the top, sides and bottom by an air space, and provided with one or more apertures to admit outside atmosphere to said air space into direct contact with the battery.

5. The combination with a battery, of a battery container inclosing said battery and having provision for supporting the same elevated above the bottom of said container to provide an air space between the bottom of said battery and said container, the sides of said battery being separated from said container by an air space, and the bottom of said container having one or more apertures to admit outside atmosphere to said air space and into direct contact with the battery.

6. The combination with a battery, of a battery container inclosing said battery and having a perforated bottom provided with means for supporting said battery in spaced relation with the bottom to permit the entrance of outside air through the bottom into the space between the battery and its container and into direct contact with the battery.

7. The combination with a battery, of a battery container inclosing said battery and having a perforated bottom permitting the entrance of outside air into an air space between the battery and its container and into direct contact with the battery.

8. The combination with a battery, of a battery container inclosing said battery and having a perforated bottom provided with a raised portion supporting the battery in spaced relation with the perforation or perforations in said bottom to permit the entrance of air.

9. The combination with a battery, of a battery container inclosing said battery and provided with one or more perforations, and an inner jacket interposed between said battery and container and provided with one or more openings.

10. The combination with a battery, of a battery container inclosing said battery and having an opening for the removal and insertion of said battery, the side opposite the opening having one or more perforations forming one or more direct passages to said battery.

11. The combination with a battery, of a battery container inclosing said battery and having an opening for the removal and insertion of said battery, the side opposite the opening having one or more perforations forming one or more direct passages to said battery and means for supporting the battery in spaced relation to the last mentioned wall.

12. The combination with a battery, of a battery container inclosing said battery and having an opening for the removal and insertion of said battery, the side opposite the opening having one or more perforations forming one or more direct passages to said battery and means for supporting the battery in spaced relation to the walls of the container thereby forming an air space communicating with said perforations.

13. A battery container having an opening for the introduction of a battery, a closure for said opening, the two parts having one a groove and the other lugs to interlock with the groove, the container having a strengthening bead adjacent the opening.

14. In combination with a battery, a container of larger size than said battery to contain the same loosely, said container having an opening for the introduction of a battery, a closure for said opening, the two parts having one a groove and the other lugs to interlock with the groove, the container having a strengthening bead adjacent the opening.

In testimony whereof, I have signed my name to this specification, in the presence of subscribing witnesses.

ELLSWORTH A. HAWTHORNE.

Witnesses:
E. HORACE HAWTHORNE,
ANNA A. KAIEROSKY,
E. STEWART HAWTHORNE.